United States Patent
Seksaria et al.

(10) Patent No.: US 6,672,642 B1
(45) Date of Patent: Jan. 6, 2004

(54) HYBRID TAILGATE

(75) Inventors: Dinesh Seksaria, Novi, MI (US); John W. Cobes, Lower Burrell, PA (US); Romeo Pascasio, Beverly Hills, MI (US); Ed Timko, Jeannette, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/170,010

(22) Filed: Jun. 11, 2002

(51) Int. Cl.[7] .............................................. B62D 33/023
(52) U.S. Cl. ................... 296/50; 296/146.8; 296/146.5; 296/146.6
(58) Field of Search ......................... 296/50, 57.1, 51, 296/146.5, 146.6, 146.8, 146.11, 901.01, 106; 49/501; 52/784.1

(56) References Cited

U.S. PATENT DOCUMENTS

| | | | |
|---|---|---|---|
| 2,959,448 A | | 11/1960 | Bogater et al. |
| 3,700,076 A | | 10/1972 | Forsting et al. |
| 4,201,411 A | | 5/1980 | Morgan |
| 4,306,381 A | | 12/1981 | Presto |
| 4,529,244 A | | 7/1985 | Zaydel |
| 4,598,008 A | | 7/1986 | Vogt et al. |
| 4,769,951 A | | 9/1988 | Kaaden |
| 4,786,100 A | | 11/1988 | Kleemann et al. |
| 4,861,093 A | | 8/1989 | Chapman |
| 4,939,828 A | | 7/1990 | Maier |
| 5,040,334 A | * | 8/1991 | Dossin et al. ................ 296/146 |
| 5,215,346 A | | 6/1993 | Reitzloff |
| 5,328,225 A | | 7/1994 | Melching et al. |
| 5,425,564 A | | 6/1995 | Thayer |
| 5,536,060 A | | 7/1996 | Rashid et al. |
| 5,660,427 A | | 8/1997 | Freeman et al. |
| 5,678,876 A | | 10/1997 | Sargent et al. |
| 5,857,732 A | | 1/1999 | Ritchie |
| 5,944,373 A | | 8/1999 | Seksaria et al. |
| 5,988,724 A | * | 11/1999 | Wolda ........................ 296/57.1 |
| 6,164,716 A | * | 12/2000 | Palazzolo et al. ......... 296/146.6 |
| 6,502,821 B2 | * | 1/2003 | Schneider ................ 296/146.6 |
| 6,503,585 B1 | * | 1/2003 | Wagenblast et al. ....... 428/34.1 |

FOREIGN PATENT DOCUMENTS

EP 0142435 2/1988

OTHER PUBLICATIONS

Abstract of EP 142435, published May 1985.*

* cited by examiner

*Primary Examiner*—Joseph D. Pape
*Assistant Examiner*—H. Gutman
(74) *Attorney, Agent, or Firm*—Charles H. Dougherty, Jr.; Gary P. Topolosky

(57) ABSTRACT

A lightweight tailgate assembly for pickup trucks and other motor vehicles includes several metal panels that are made from a single metal sheet and a plastic reinforcing module between inner and outer metal panels. The side panels of the tailgate are formed as part of the plastic reinforcing module. A preferred assembly may also include a hinge device for connection with a truck body and a latch mechanism for locking the assembly between opposed rear corner posts in a truck body. The hinge device may be integrally molded into the plastic reinforcing module. A particularly preferred tailgate assembly made with AA 6022 aluminum alloy sheet and a reinforcing module containing polymer and glass fibers may weigh less than half as much as a conventional steel truck tailgate. Metal cover plates can be used to obscure visibility of the plastic side panels from the exterior.

16 Claims, 8 Drawing Sheets

HYBRID TAILGATE

BACKGROUND OF THE INVENTION

1. Field of the Invention

The present invention relates to body closure panels suitable for use on motor vehicles, and more particularly to a tailgate for pickup trucks.

2. Description of the Background

A conventional tailgate, as presently used in pickup trucks and other motor vehicles, may be a relatively heavy assembly, weighing up to about 50 pounds. The assembly is typically made from a number of stamped steel sheets that are joined together by resistance spot welding and hemming. Steel reinforcements may be welded to the sheets, adding strength and rigidity at critical locations.

Pickup trucks, as an example, are hard working vehicles wherein the tailgate is expected to perform reliably for many years. Pickup truck buyers expect that these closure panels be strong, reliable, and look good. The tailgates should also be manufactured to a close tolerance or margin, and all such manufactured tailgates should appear to have a uniform gap to adjacent panels. Tailgates are expected to withstand people or heavy loads standing on them in an open position, as well as loads placed on a top edge when they are closed. The tailgate assemblies may also be used to tie down payloads carried in the truck bed.

Because many pickup truck users are female and may be petite in stature, the tailgate is preferably as lightweight as possible while maintaining sufficient strength. It may also be desirable to reduce tailgate weight so that the truck's payload can be increased without sacrificing fuel economy.

Presently available tailgates are heavy because they are made from steel. In addition, because they are assembled from many components, conventional tailgates may not be as reliable, strong, or durable as desired. These steel panels are also subject to attack by moisture, road salt, and other chemical agents in the environment that are corrosive to steel and eventually detract from its structural integrity and appearance. Accordingly, there is a consistent need to provide a lightweight, strong, durable tailgate panel for pickup trucks that has minimal impact upon vehicle cost. It is also desirable to reduce tailgate weight in order to improve fuel efficiency and truck payload capacity.

Some issued patents disclosing pickup truck tailgates include U.S. Pat. Nos. 4,861,093; 4,939,828; 5,328,225; 5,425,564; and 5,678,876. Although prior art pickup truck tailgates generally perform adequately, tailgates made from steel sheets detract from fuel economy and are cumbersome to lift manually because of their large weight. Accordingly, a lightweight replacement for steel is always desired.

In recent years, some vehicle body panels have been made from thermoplastic polymers. Such panels are often lighter than steel. However, they generally provide reduced strength and rigidity compared with steel panels. Because the tailgate has high strength expectations, these polymer-based body panels may not be appropriate in tailgate design.

As a possible partial solution to this strength versus weight problem, it has been suggested that a hybrid tailgate design, utilizing both lightweight plastics and metals, be implemented. For example, U.S. Pat. No. 5,944,373 (which is expressly incorporated by reference into this application in its entirety) discloses a hybrid tailgate assembly comprised of a plastic reinforcing module housed between a single metal sheet wrapped around the reinforcing module. The metal sheet may be made of an aluminum alloy to reduce the weight of the tailgate as compared to traditional steel tailgates. However, the tailgate may be more expensive and difficult to produce than traditional steel tailgates. Also, because the aluminum or other metal may not be as accurately formed as steel, many of these aluminum-based hybrid tailgate assemblies may not have acceptable mechanical tolerances or margins that meet customer expectations.

The hybrid tailgate works on the premise of an I-beam. A central member, or web, keeps apart two flanges located at opposite ends of the central web. The strength of the I-beam is determined, among other factors, from the strength of the two exterior flanges and their cross-sectional area. The interior central web separates the two flanges but can be weaker than the flange material (e.g., as with corrugated cardboard). Therefore, the hybrid tailgate uses the relatively weaker plastic material for the interior reinforcing module and the somewhat stronger aluminum or other material for the inner and outer panels (the flanges). An aluminum skin by itself, in the same configuration as the conventional steel tailgate, may not be stiff enough for the intended uses of the tailgate.

Even with the improvements over the prior art discussed above, there is a consistent need to further reduce the weight of the tailgate while preferably maintaining the strength and outward appearance of the tailgate. The tailgate may be made as a hybrid of plastics and metals, such as aluminum, and the tailgate assembly should be easy to manufacture as compared to conventional methods. Also, the resulting mechanical tolerances of the tailgate assembly once installed in a pickup truck or other motor vehicle are preferably improved in relation to the prior art.

These and other objectives and advantages of the present invention will become readily apparent to persons skilled in the art from the following description of particularly preferred embodiments.

SUMMARY OF THE INVENTION

In accordance with the present invention, there is provided a lightweight tailgate assembly for pickup trucks or other motor vehicles. The tailgate assembly includes inner and outer metal panels and a plastic reinforcing module attached between the inner and outer panels. The metal panels preferably act as a shell or housing around the reinforcing module.

In one aspect of the present invention, the metal panels may be made from aluminum or other sheet metal and preferably comprise an aluminum alloy of the AA2000, 5000, 6000 or 7000 series. Aluminum alloys of the AA6000 series, comprising aluminum alloyed with magnesium and silicon, are particularly preferred. The metal panels are preferably made from a single sheet, stamped and folded into a desired configuration.

The tailgate assembly may also include top and bottom metal panels extending between the inner and outer panels. The top and bottom panels are preferably generally parallel to each other. The inner and outer panels are also generally parallel.

The reinforcing module may comprise a thermoplastic resin, preferably polyester reinforced with glass fibers. Other suitable thermoplastics include polyolefins such as polypropylene and ethylene-propylene copolymers, polyvinyl chloride, polycarbonates, polyurethanes, and mixtures thereof. The reinforcing module preferably provides separation and support to the metal outer shell.

The reinforcing module includes a main leg extending between side legs; a top leg adjacent the top panel; a plurality of support legs connecting the main leg and the top leg; and two bottom legs extending diagonally downwardly from the main leg to lower portions of the side legs. Preferably, the reinforcing module includes side legs of sufficient geometry to at least partially constitute the side panels of the completed tailgate. This may reduce the necessity of heavier metal side panels.

The fastener used to attach the metal panels to the reinforcing module may include metal screws or bolts such as a plurality of metal screws extending through the metal inner panel into the reinforcing module. In a preferred embodiment, the reinforcing module can be connected with the metal inner and outer panels by an adhesive, either in addition to or in place of the screws.

In a preferred embodiment, the tailgate assembly includes a hinge device (hinge collar) for connecting the assembly to a truck body. A preferred hinge device may be a plastic hinge collar that is integrally molded into the reinforcing module. Alternatively, the tailgate assembly may include separate metal hinge collars attached to the plastic side panels and extending laterally outwardly. The metal collars mate with metal hinge pillars or pins attached to rear corner posts on the truck body.

Two such collars are placed collinearly in the horizontal plane at the lower portion of the tailgate for a conventionally-opening (top-down) tailgate. Similarly, two collars are placed collinearly with an axis in the vertical plane for at least one embodiment of a side-swinging tailgate. In either case, the collars may be integrally molded into the reinforcing module or may be separate metal hinge collars.

The tailgate assembly also includes a latch assembly for locking the tailgate between opposed rear corner posts in a truck body. The latch assembly includes a base plate attached to the inner panel; a handle supported by the base plate and extending through an opening in the outer panel; and connecting rods extending laterally outwardly from the handle and connecting with the rear corner posts. For a side-swinging tailgate, the latch preferably engages with the rear corner posts only on the side of the tailgate opposite the vertical hinges described above.

If some users do not wish to have visible plastic side legs on the tailgate, optional cover plates may be attached to the outside of the plastic side legs to at least partially obscure the plastic edge. These cover plates may include the metal hinge collars described above. These and other embodiments and advantages of the present invention will be better understood with reference to the following figures and detailed description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention broadly contemplates, in at least one preferred embodiment, a hybrid motor vehicle tailgate comprised of a plastic reinforcing module contained within an outer compartment defined at least partially by surrounding metal panels. The outer metal panels may be a single sheet of metal material, and the plastic reinforcing module is preferably a rib-based structure that is exposed on at least the sides of the tailgate assembly.

Figure 1:
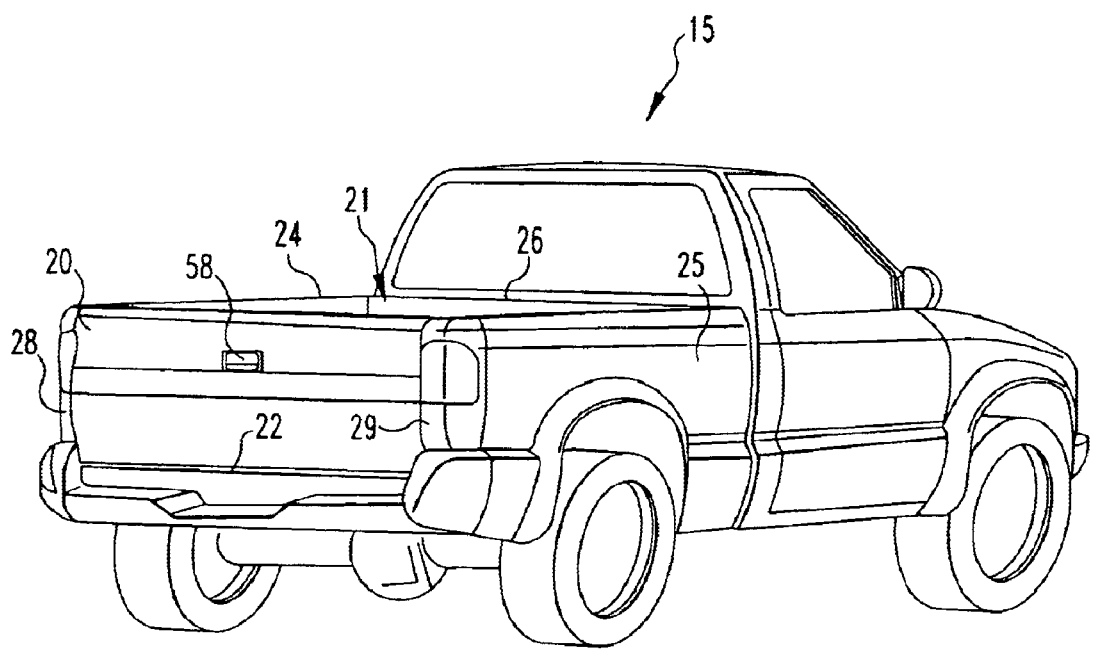
FIG. 1 is a perspective view of a pickup truck showing a tailgate assembly made in accordance with the present invention.

There is generally indicated at 15 in FIG. 1 a pickup truck having a tailgate or tailgate assembly 20 made in accordance with the present invention. The truck 15 has a truck bed 21 defined by a bed floor 22, the tailgate 20, bed side walls 24, 25, and a bed front wall 26. Rear corner posts 28, 29 behind the side walls 24, 25 support hinge pillars (not shown) for the tailgate 20.

The tailgate 20 is preferably hingedly attached to the rear corner posts 28, 29 at the base or lower end of the tailgate 20. By manipulating the tailgate latch handle 58, the tailgate 20 may be released from the hinge pillars of the corner posts 28, 29, and the interior of the truck bed 21 may be accessible from the rear of the truck 15. In the open position, the tailgate 20 rests approximately parallel to the bed floor 22 of the truck 15 and extends outward away from the back of the truck 15. The upper portion of the open tailgate 20 is preferably of sufficient strength and rigidity in this open position to support the weight of normal use of the tailgate 20 (e.g., a user standing on the open tailgate).

Figure 2:
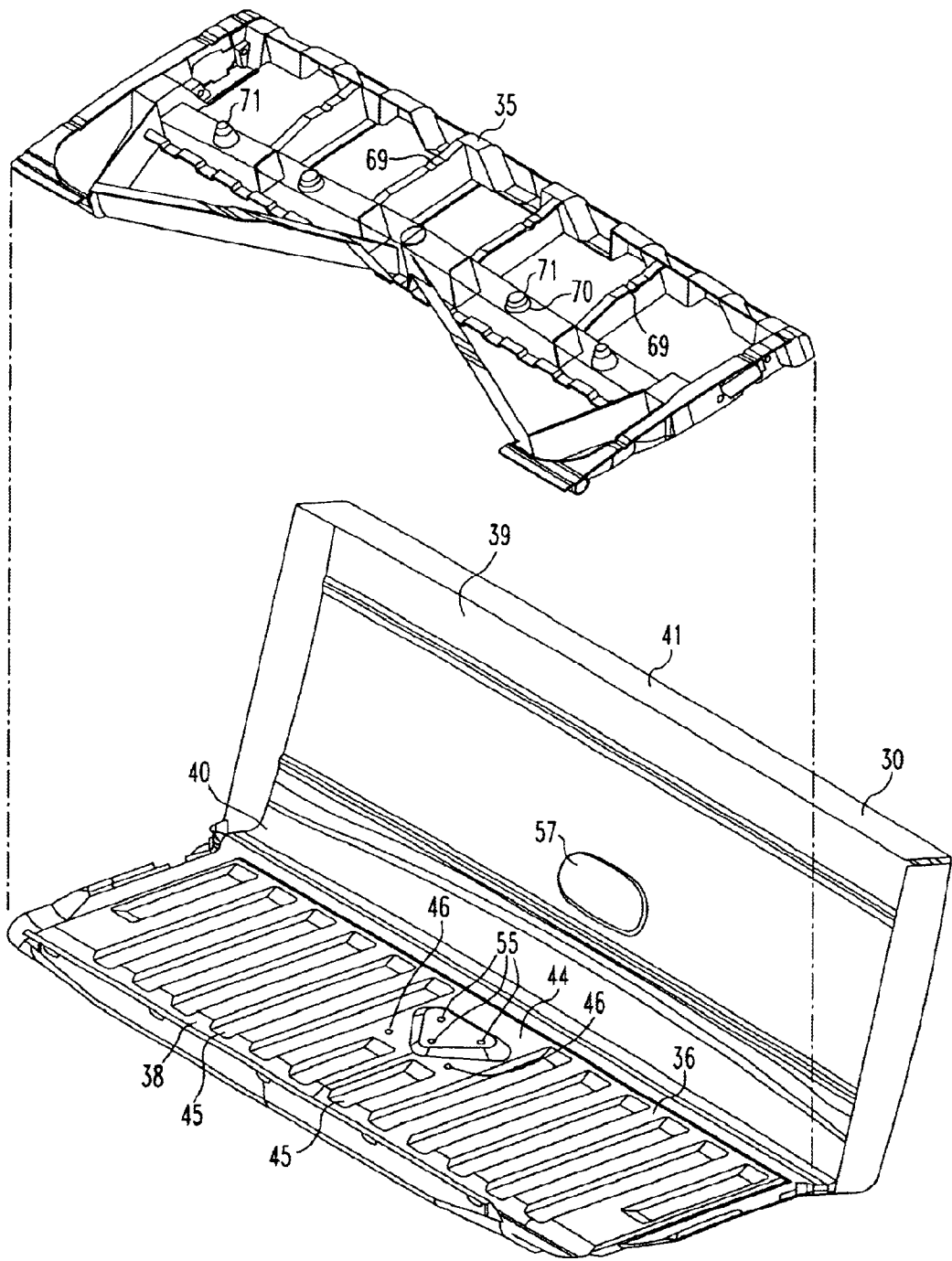
FIG. 2 is a perspective view of a tailgate assembly of the present invention including a plastic reinforcing module and a metal outer skin.
Figure 3:
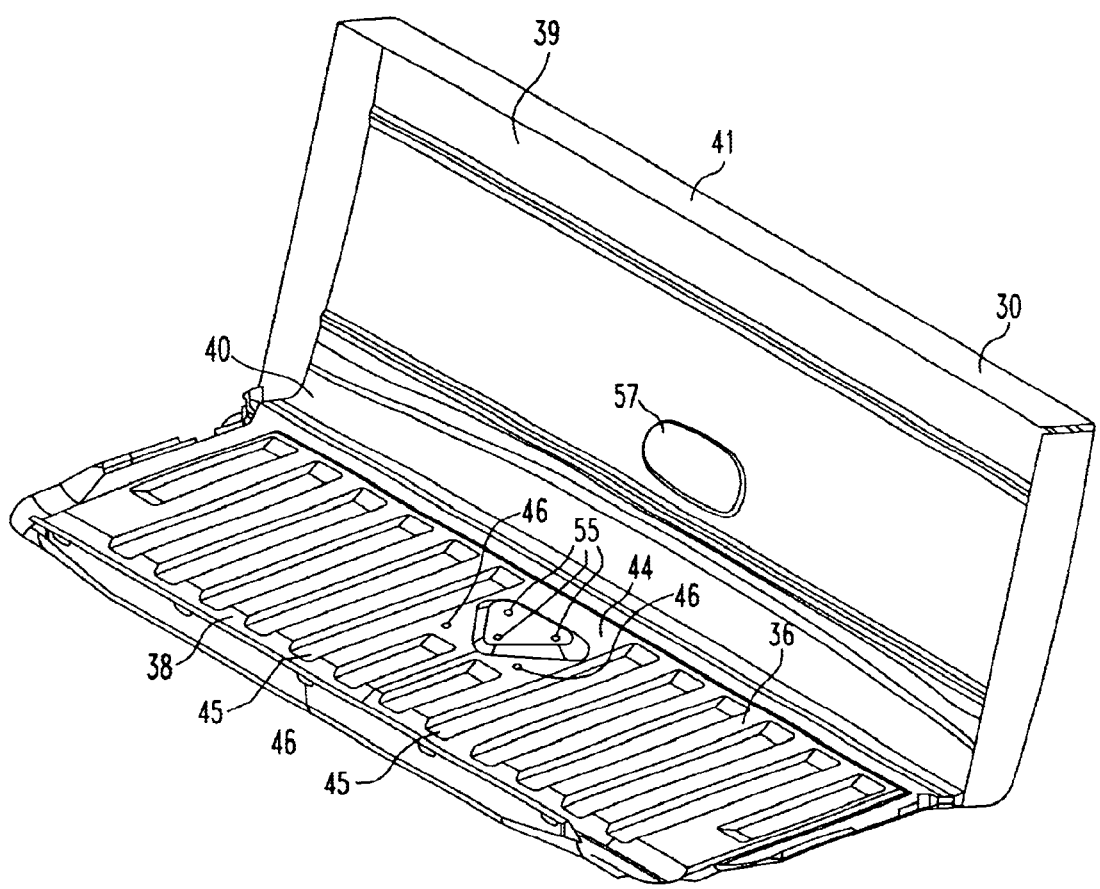
FIG. 3 is a perspective view of a metal sheet deformed into several metal panels.
Figure 4:
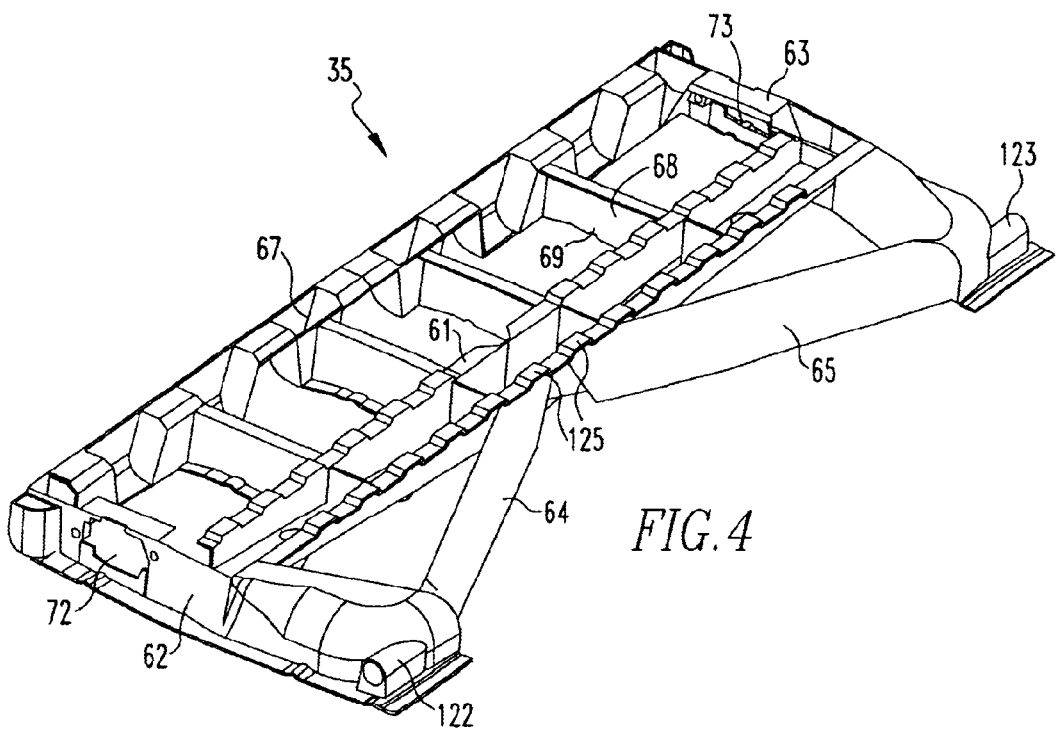
FIG. 4 is a perspective view of a plastic reinforcing module of the present invention.

As shown in FIGS. 2–4, the tailgate 20 preferably includes a single metal sheet 30 deformed into several metal panels and a plastic reinforcing module 35 contained within a compartment 36 at least partially defined by the metal panels. FIG. 2 shows the plastic reinforcing module 35 being lowered in place inside the metal panels before closure and hemming of the tailgate structure. FIG. 3 shows the deformed metal sheet 30 with the plastic reinforcing module 35 removed for clarity. FIG. 4 shows one example of a plastic reinforcing module 35 as used in the present invention. FIG. 4 shows the reinforcing module 35 from the inside of the tailgate and FIG. 2 shows the reverse side of the reinforcing module 35 (from the outside of the tailgate).

As best shown in FIG. 3, the metal sheet 30 or "skin" is deformed to include an inner panel 38, an outer panel 39, a top panel 40, and a bottom panel 41. The metal sheet 30 may also include one or more side panels to aid in hemming or otherwise attaching the various surfaces of the metal sheet 30 to each other, around the plastic reinforcing module 35 (see below). The inner panel 38 generally faces the interior of the truck bed 21 when the tailgate 20 is mounted on a truck in the closed position. The outer panel 39 faces the outside (rear) of the truck 15 when mounted in the same closed position. The metal sheet 30 preferably comprises an AA 6022 aluminum alloy in the T4 temper (which preferably approaches the mechanical strength of a T6 after baking of the paint) and may have a gauge of about 1.0–1.25 mm. A particularly preferred sheet 30 has a gauge of about 1.2 mm.

The inner panel 38 may be deformed to include a generally planar principal surface 44 and several vertical ribs 45 extending inwardly from the principal surface 44. The principal surface 44 may define fastener opening 46 for metal screws or bolts interconnecting the inner panel 38 to the reinforcing module 35. As described below, the reinforcing module 35 may also be secured to the metal sheet 30 in various places by an adhesive. Three bolts (not shown) extending through holes 55 may join a latch mechanism (described below) to the inner panel 38.

As shown in FIGS. 2 and 4, the plastic reinforcing module 35 is preferably a one-piece molding of polyester reinforced with glass fibers. Other suitable thermoplastic resins for the module 35 may include polyolefins such as polypropylene and other ethylene, propylene copolymers, polyvinyl chloride, polycarbonates, polyurethanes, and mixtures of these polymers.

The aluminum alloy or other metal sheet 30 may not be as stiff as a conventional steel tailgate without additional reinforcement. The reinforcing module 35 is used to strengthen the hybrid tailgate 20 without affecting the aesthetic appeal of, for example, a conventional tailgate. The reinforcing module 35 preferably acts as the separator or middle piece of an I-beam structure defined by the inner panel 38 and outer panel 39. The reinforcing module 35 separates the inner panel 38 from the outer panel 39 according to conventional tailgate geometries and provides the necessary support for rough use of the tailgate 20.

The reinforcing module 35, as best seen in FIG. 4, preferably includes a main leg 61 extending laterally between two side legs 62, 63 that define the sides of the tailgate 20. Two Z-stiffeners or bottom legs 64, 65 may extend diagonally downward from the main leg 61 into the bottom corners of the compartment 36 adjacent bottom ends of the side legs 62, 63. A top leg 67 adjacent the top panel 40 may extend between top portions of the side legs 62, 63. Approximately four vertically extending support legs 68 may connect the main leg 61 with the top leg 67. The support legs 68 preferably each include a small groove 69 accommodating one of the metal rods in the latch mechanism (described below).

The side legs 62, 63 are preferably more substantial than the other support legs in the hybrid tailgate 20 of the present invention. These side legs 62, 63 may take the place of a metal side panel as used on conventional tailgate assemblies. Incorporating a plastic side panel 62, 63 into the hybrid tailgate 20 may reduce the overall weight of the tailgate compared to conventional steel tailgates as well as compared to other previous hybrid tailgates. Additionally, the dimensional tolerances of the plastic reinforcing module 35 can be controlled to a much greater margin than the tolerances associated with deforming an aluminum, steel, or other metal sheet into a side panel. Because the aluminum deformation can not be controlled as accurately as the plastic molding process, the hybrid tailgate 20 of the present invention appears to be manufactured more accurately to the casual observer once the tailgate is in place as part of a truck or other vehicle.

The side legs 62, 63 may define large openings 72, 73 through which a latch mechanism (not shown) can be inserted for locking and unlocking the tailgate 20 from the corner posts 28, 29 of the pickup truck 15. The side legs 62, 63 also may include an integral hinge collar or joint 122, 123 to attach the hybrid tailgate 20 to the base of the rear corner posts 28, 29 of the pickup truck 15. Traditionally, a hinge collar or tailgate pivot (not shown) was attached to the tailgate assembly after formation. Because the plastic used in the reinforcing module 35 may be a natural hinge material (combining strength with decreased surface friction), a hinge collar or joint 122, 123 may be integrally molded into the reinforcing module 35 as shown in FIG. 4.

As shown in FIG. 2, the main leg 61 may also include several outwardly extending truncated cones 70. In a preferred embodiment, an adhesive 71 may be applied to outer portions of the cones 70. A foamed polyurethane adhesive may be particularly preferred. The adhesive 71 joins the reinforcing module 35 to the metal outer panel 39.

At several locations, the surface of the main leg 61, the side legs 62, 63, and other areas of the reinforcing module may be ribbed or molded into the shape of a "W" 125. These formations 125 preferably match similar formations in the inner panel 38 of the metal sheet 30 (i.e., the principle surface 44 and the vertical ribs 45 in the inner panel 38). When the reinforcing module 35 is inserted into the interior compartment 36 of the deformed metal sheet 30, the metal sheet deformities (44, 45) and the reinforcing module "W" deformities 125 preferably align or mate, and the reinforcing module 35 "locks" into place within the metal sheet compartment 36. This locking may provide a further I-beam support feature and may strengthen the hybrid tailgate 20. In this way, the ribbed features of the inner panel 38 that were necessary for strength and desirable for aesthetics in a conventional steel tailgate may be incorporated into the hybrid tailgate 20 even when not necessary. Keeping the tailgate ribbed features maintains a consistent "look and feel" between the present invention and conventional steel and other tailgates.

Figure 5:
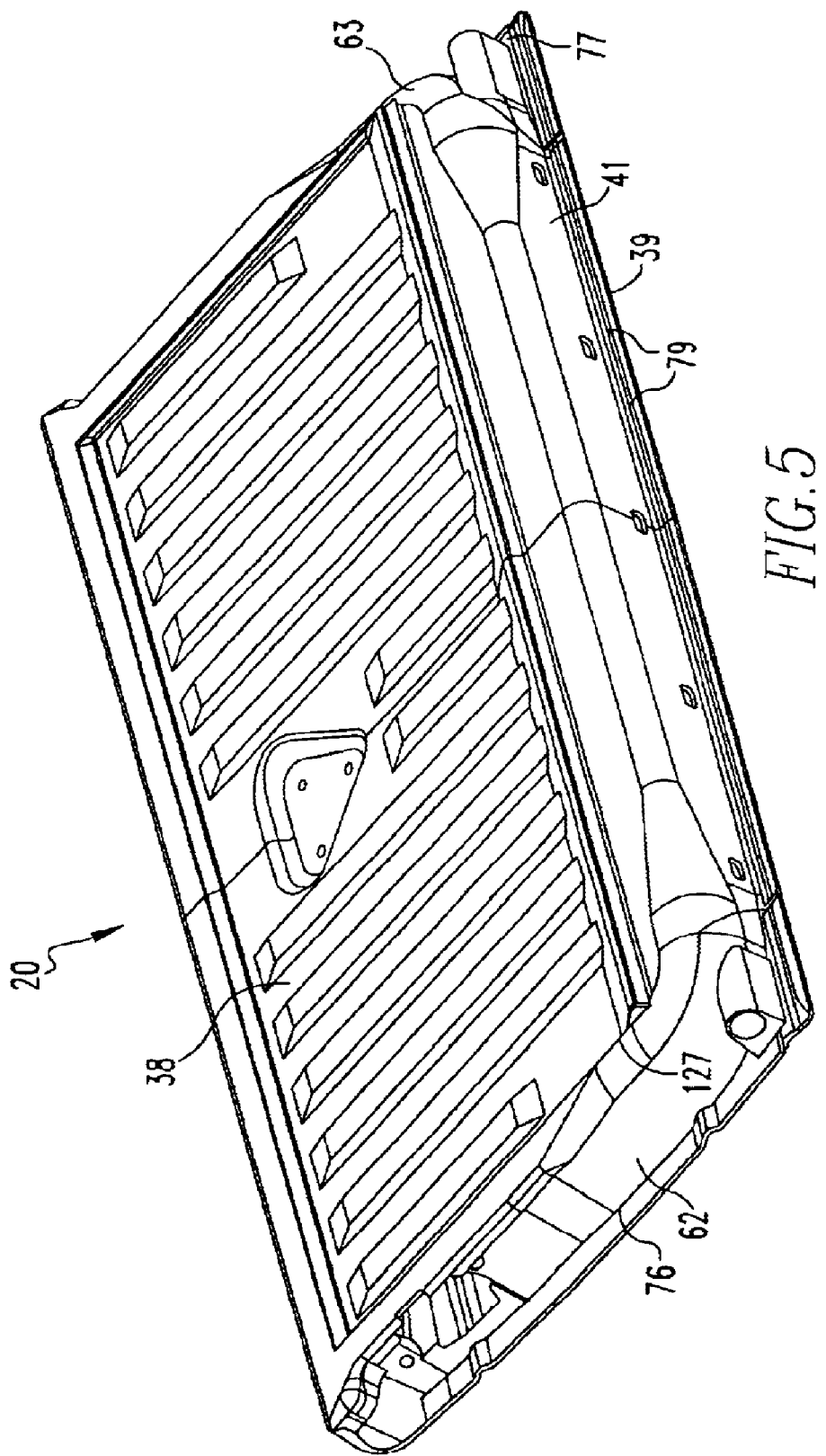
FIG. 5 is a perspective view of a tailgate assembly of the present invention with two integral plastic hinge collars.

FIG. 5 shows a completed hybrid tailgate 20 according to the present invention when viewed from inside the truck bed. The FIG. 5 assembly is accomplished by taking the assembly shown in FIG. 2 (the reinforcing module 35 inserted within the deformed metal sheet 30) and completing the folding of the outer panel 39 over the reinforcing module 35. As shown in FIG. 5, the outer panel 39 is joined to the bottom panel 41 by a bottom hem 79. The outer panel 39 may be joined to the side legs 62, 63 by side hems 76, 77. The hems 76, 77, 79 are preferably made by overlapping edge portions of the metal panels and then folding and compressing the edge portions together so that they remain permanently sealed.

FIG. 5 also shows an "overlapping" juncture of the inner panel 38 and the side legs 62, 63 (at seam 127). Because the side legs 62, 63 preferably define the side area of the hybrid tailgate 20, there is a seam 127 that runs along the inner portion of the side legs 62, 63 (facing up in FIG. 5) where plastic and metal meet (at 127). To prevent cutting or scratching a tailgate operator from, an exposed edge and to establish a more visually appealing product, the "inner" portion of the side legs 62, 63 is preferably recessed, routed, or otherwise depressed to accept the inner panel 38 so that the inner metal panel 38 is flush with the side legs 62, 63 at seam 127.

More specifically, the side legs 62, 63 can be described as having an outer face and a recessed face wherein the recessed face is slightly lower or indented into the reinforcing module 35. An outer face of the metal inner panel 38 is flush with the outer face of the side legs 62, 63 after the inner panel 38 is inserted into the recess of the side legs of the reinforcing module. At the seam 127, adhesive may be applied to secure the inner panel 38 to the side legs 62, 63.

Figure 6:
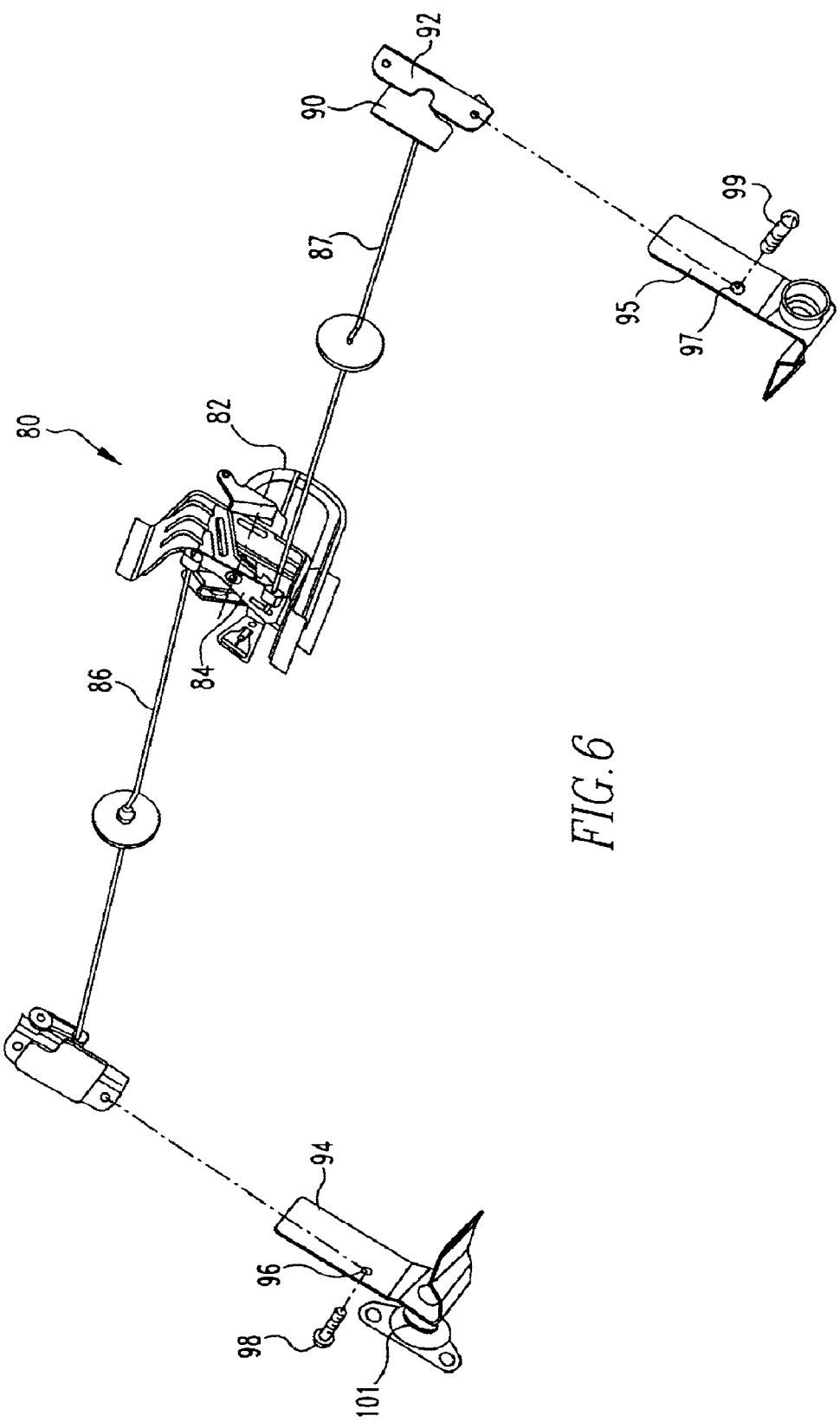
FIG. 6 is an exploded, fragmentary view showing the latch mechanism and optional metal hinge collars of the present invention.

A latch mechanism 80 for locking the tailgate assembly 20 between two rear corner posts 28, 29 is shown in FIG. 6. The latch mechanism 80 preferably includes a base plate 82 that is secured to the inner panel 38, a lever arm 84 pivoted on the base plate 82, and metal rods 86, 87 extending from opposed ends of the lever arm 84. A metal lock 90 attached to the right rod 87 interacts with a metal plate 92 affixed to the right rear corner post 29 to lock the tailgate assembly 20 in place. Any of a variety of similar latching mechanisms may be used with the present invention, and the structure of the side legs 62, 63 could be altered to accommodate various latching mechanisms. The outer panel 39 may include a large opening 57 for a latch handle 58 (shown in FIG. 1).

Figure 7:
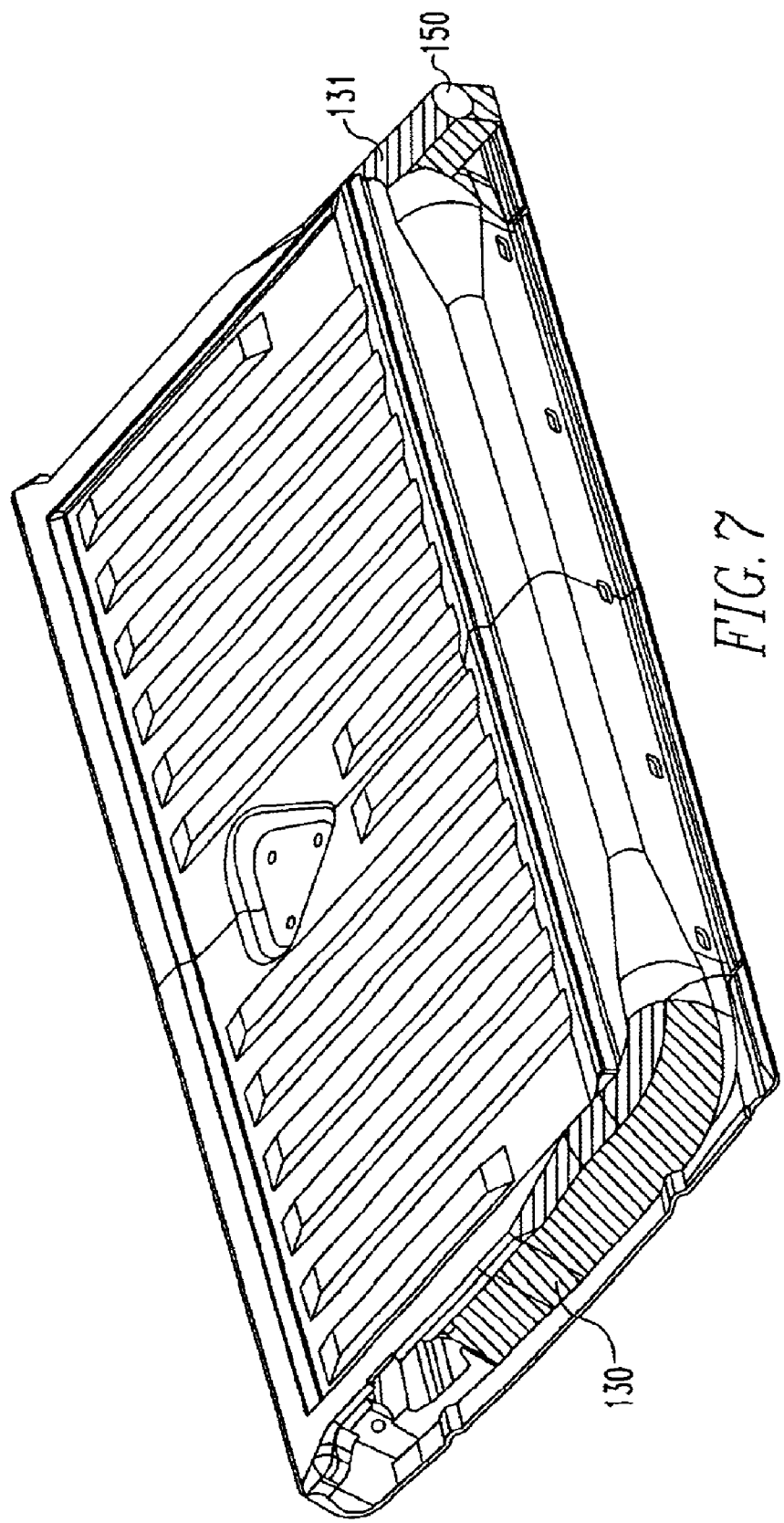
FIG. 7 shows a perspective view of a hybrid tailgate with a single attached metal hinge collar.

As previously described, the tailgate assembly 20 preferably connects with two rear corner posts 28, 29 on a truck body by a hinge collar 122, 123 or other device that can be integrally manufactured as part of the side legs 62, 63 of the plastic reinforcing module 35. Alternatively, the hinge device may be attached to the outside edge of the side legs 62, 63. For example, FIG. 6 shows two metal hinge collars 94, 95 that may be secured to opposite side legs 62, 63 of the tailgate assembly 20. The hinge collars 94, 95 may each include a metal plate defining an aperture 96, 97 for bolts 98, 99 anchored in the side legs 62, 63 of the reinforcing module 35. The hinge collars 94, 95 may each engage with a hinge pin 101 affixed to one of the truck corner posts 28, 29. FIG. 7 shows one example of a hybrid tailgate 20 according to the present invention wherein the hinge collars are bolted or otherwise attached to the side legs 62, 63 of the reinforcing module 35.

Figure 8:
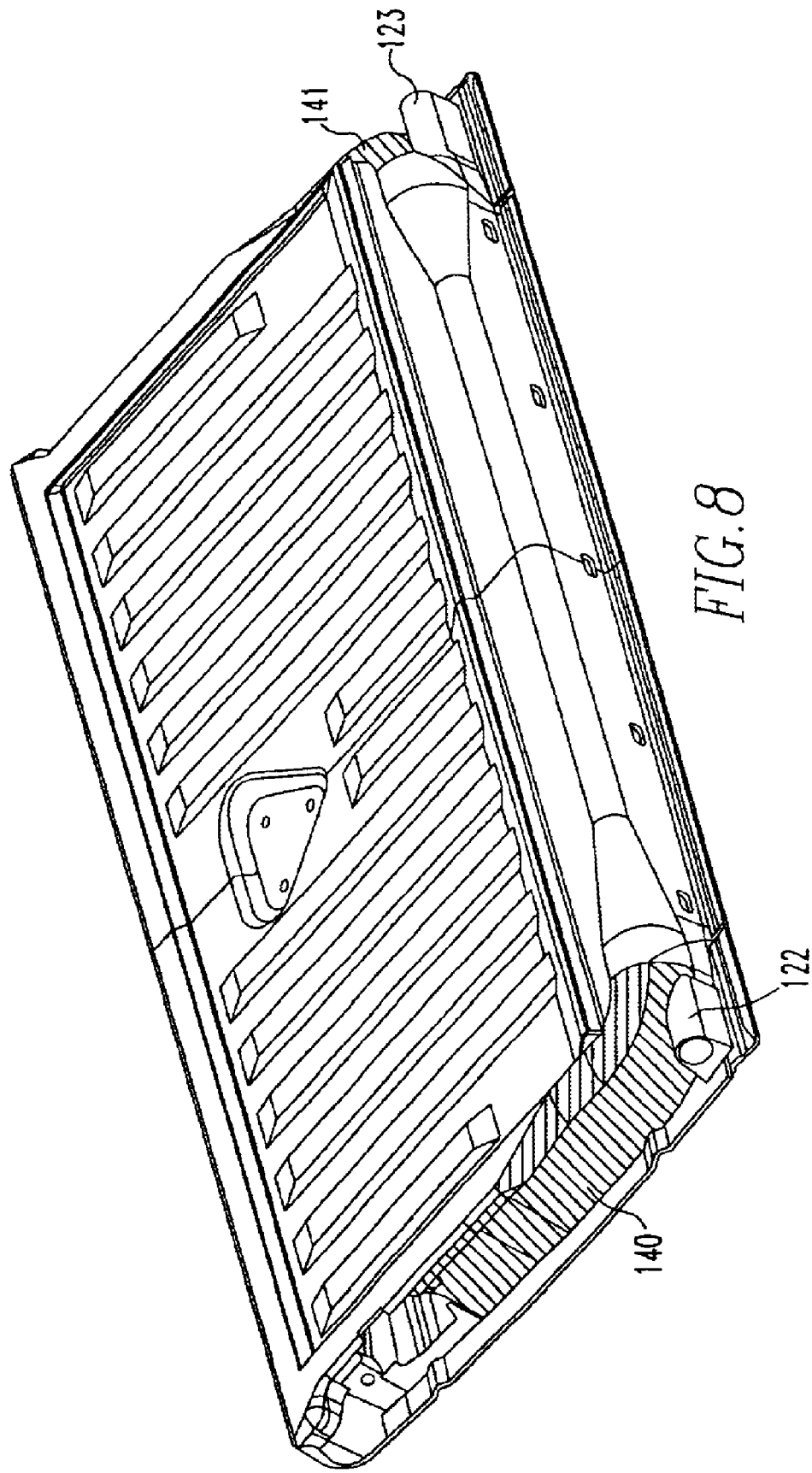
FIG. 8 shows a perspective view of a hybrid tailgate with partial metal side panel cover plates and integral plastic hinge collars.

Although the benefits of replacing a traditional steel tailgate with a hybrid tailgate 20 and replacing metal side panels with plastic legs 62, 63 have been described above, there may be a perception with some users that the plastic areas of the tailgate are unattractive or weak. To lessen this perception, a decorative metal trim cover or other covering could be attached to the outer surfaces of the side legs that are visually exposed to a user after installation of the tailgate in a vehicle. FIGS. 7 and 8 show two possible examples of metal face plates 130, 131 and 140, 141.

FIG. 7 details two metal face plates 130, 131 (shown cross-hatched in FIG. 7) attached over the outer side faces of the side legs 62, 63 of the reinforcing module 35. The tailgate 20 shown in FIG. 7 is used for a side swinging tailgate with attached vertical metal hinge collars 150 rather than the vertically swinging horizontal hinge collar tailgates described above. In this case, side covering 130 covers the entire outer portion of the side leg 62 except for the hole which accepts the upper locking pillar of the left corner post of the truck. The opposite side covering 131 also includes the vertical metal hinge collar 150 to secure the tailgate to the truck bed. An additional vertical-mounted hinge collar (not shown) has a collinear axis with vertical hinge collar 150 and is at the top of the tailgate. From the outside, this hybrid tailgate appears generally to be made of metal. The side plates 130, 131 (including metal hinge collar 150) may be affixed to the rest of the tailgate with metal fasteners, screws, adhesive and/or any other combination of materials.

FIG. 8 shows a hybrid tailgate 20 with integrally molded plastic hinge collars 122, 123 (from FIG. 5) but with partial metal face plates 140, 141 (shown cross-hatched) to hide some of the plastic components. With this embodiment, the lightweight plastic hinge collars can be used with a tailgate that "appears" to be made all of metal because of partial face plates 140, 141. The FIG. 8 tailgate has two such hinge collars 122, 123 as with a conventionally opening tailgate. The partial face plates 140, 141 of this embodiment are for decorative purposes only. Other than the face plates, this embodiment is the same as that shown in FIG. 5.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A lightweight tailgate assembly for trucks, comprising:
    (a) an inner panel, an outer panel spaced from said inner panel, and top and bottom panels extending between said inner and outer panels, said inner and outer panels being integrally formed from a single, aluminum alloy sheet;
    (b) a plastic reinforcing module between said inner and outer panels, said module including a top leg adjacent to said top panel and at least one diagonal bottom leg adjacent to said bottom panel at one end of the bottom leg, said module further including two partially exposed side legs that form the side walls of the tailgate assembly;
    (c) means for joining said module to said inner panel; and
    (d) at least one metal face plate disposed on said reinforcing module to at least partially cover said partially exposed side legs.

2. The tailgate assembly of claim 1, wherein said inner, outer, top, and bottom panels are all made from the single, aluminum alloy sheet.

3. The tailgate assembly of claim 2, wherein said inner and outer panels are generally parallel.

4. The tailgate assembly of claim 2, wherein said sheet is made from an aluminum alloy selected from the group consisting of a 2000, 5000, 6000, or 7000 series aluminum alloy (Aluminum Association designation).

5. The tailgate assembly of claim 1, wherein said module comprises a thermoplastic resin selected from polyester, polyolefins, polyvinyl chloride, polycarbonates, polyurethanes, and mixtures thereof.

6. The tailgate assembly of claim 5, wherein said module further comprises glass reinforcing fibers.

7. The tailgate assembly of claim 1, wherein said plastic reinforcing module has at least one hinge collar integrally molded therewith.

8. The tailgate assembly of claim 1, wherein said two side legs are at least partially recessed to accept said inner panel flush with an outer face of the two side legs.

9. A tailgate assembly, comprising:
a formed metal sheet;
a plastic reinforcing module disposed at least partially within said formed metal sheet, and
at least one metal face plate disposed at least partially on the plastic reinforcing module at the location where the tailgate assembly is defined by the plastic reinforcing module, wherein said tailgate assembly is defined by the plastic reinforcing module on at least one side.

10. The tailgate assembly of claim 9, wherein said tailgate assembly is defined by the plastic reinforcing module on two sides.

11. The tailgate assembly of claim 9, wherein said plastic reinforcing module has at least one hinge collar integrally molded therewith.

12. The tailgate assembly of claim 9, wherein said reinforcing module includes an outer face and at least one recessed face adapted to accept the formed metal sheet flush with the outer face of the reinforcing module.

13. The tailgate assembly of claim 9, wherein said formed metal sheet includes a plurality of ribs and said reinforcing module includes a corresponding plurality of formations that match the shape of said ribs.

14. The tailgate assembly of claim 13, further including an adhesive applied at a plurality of sites located wherein the plurality of ribs meet the plurality of corresponding formations in the reinforcing module.

15. A tailgate assembly, comprising:
an inner panel and an outer panel spaced from said inner panel;
a plastic reinforcing module between said inner and outer panels, said module having at least one hinge collar and a plurality of exposed plastic side panels integrally molded therewith; and
at least one metal face plate partially disposed on the exposed plastic side panels.

16. The tailgate assembly of claim 15, wherein said plastic reinforcing module is attached to said inner panel and said outer panel with adhesive.

* * * * *

UNITED STATES PATENT AND TRADEMARK OFFICE
CERTIFICATE OF CORRECTION

PATENT NO. : 6,672,642 B1
DATED : January 6, 2004
INVENTOR(S) : Dinesh Seksaria et al.

It is certified that error appears in the above-identified patent and that said Letters Patent is hereby corrected as shown below:

Title page,
Item [54], Title, insert -- IMPROVED --.

Signed and Sealed this

First Day of November, 2005

JON W. DUDAS
*Director of the United States Patent and Trademark Office*